United States Patent
Patberg et al.

(10) Patent No.: US 9,828,030 B2
(45) Date of Patent: Nov. 28, 2017

(54) INTEGRAL LONGITUDINAL MEMBER FOR MOTOR VEHICLES

(71) Applicants: THYSSENKRUPP STEEL EUROPE AG, Duisburg (DE); TECHNISCHE UNIVERSITÄT DRESDEN, Dresden (DE); LEICHTBAU-ZENTRUM SACHSEN GMBH, Dresden (DE)

(72) Inventors: Lothar Patberg, Moers (DE); Stefan Mayer, Schwerte (DE); Torsten Krahnert, Fritzlar (DE); Werner Hufenbach, Dresden (DE); Enrico Ladusch, Dresden (DE); Jens Werner, Coswig (DE); André Kießling, Dresden (DE); Alexander Herbig, Dresden (DE); Jörn Kiele, Dresden (DE); Martin Lepper, Dresden (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 14/896,873

(22) PCT Filed: May 21, 2014

(86) PCT No.: PCT/EP2014/060407
§ 371 (c)(1),
(2) Date: Dec. 8, 2015

(87) PCT Pub. No.: WO2014/198506
PCT Pub. Date: Dec. 18, 2014

(65) Prior Publication Data
US 2016/0194030 A1    Jul. 7, 2016

(30) Foreign Application Priority Data

Jun. 12, 2013 (DE) .................. 10 2013 106 073

(51) Int. Cl.
*B62D 21/15* (2006.01)
*B62D 25/08* (2006.01)
*B62D 29/04* (2006.01)

(52) U.S. Cl.
CPC .......... *B62D 21/152* (2013.01); *B62D 25/08* (2013.01); *B62D 25/082* (2013.01); *B62D 29/041* (2013.01); *B62D 29/043* (2013.01)

(58) Field of Classification Search
CPC .... B62D 21/157; B62D 25/025; B62D 25/04; B62D 29/043; B62D 21/152
(Continued)

(56) References Cited

U.S. PATENT DOCUMENTS 5,419,416 A * 5/1995 Miyashita ................. F16F 7/12
                                                                  188/371
5,732,801 A * 3/1998 Gertz ...................... F16F 7/123
                                                                  188/377

(Continued)

FOREIGN PATENT DOCUMENTS

CN  103140410 A   6/2013
DE  44 07 731 A1  9/1995
(Continued)

OTHER PUBLICATIONS

German Language International Search Report for International patent application No. PCT/EP2014/060407; dated Jul. 30, 2014.
(Continued)

*Primary Examiner* — Glenn Dayoan
*Assistant Examiner* — Sunsurraye Westbrook
(74) *Attorney, Agent, or Firm* — thyssenkrupp North America, Inc.

(57) ABSTRACT

Longitudinal members for motor vehicles may generally include a supporting element that is releasably connectable to an energy absorption mechanism. The supporting element
(Continued)

may typically include a joining zone that can be used to secure the supporting element to one or more chassis or drive components of the motor vehicle. The supporting element and the energy absorption mechanism may be comprised of fiber-reinforced plastic. More specifically, the supporting element may be comprised of a plurality of length portions having different fiber orientations. For example, a first length portion may have fibers oriented substantially parallel to a horizontal longitudinal plane about which the supporting element is positioned, whereas a second length portion between the first length portion and the energy absorption mechanism may have intersecting fibers oriented oblique to the horizontal longitudinal plane.

13 Claims, 3 Drawing Sheets

(58) Field of Classification Search
USPC ............ 296/187.03, 187.09, 187.12, 193.06, 296/193.02, 203.01, 204, 209; 280/735
See application file for complete search history.

(56) References Cited

U.S. PATENT DOCUMENTS

| | | |
|---|---|---|
| 6,406,088 B1 | 6/2002 | Tate |
| 7,842,378 B2 * | 11/2010 | Harada .................. F16F 7/124 |
| | | 428/137 |
| 8,905,206 B2 * | 12/2014 | Zannier .................. B60R 19/03 |
| | | 188/371 |
| 9,403,498 B2 * | 8/2016 | Hoschouer .............. B60R 19/34 |
| 2004/0247845 A1 * | 12/2004 | Abe ........................ B29C 70/08 |
| | | 428/223 |
| 2005/0147804 A1 | 7/2005 | Harada et al. |
| 2012/0074735 A1 | 3/2012 | Engertsberger et al. |
| 2013/0187406 A1 | 7/2013 | Torii |

FOREIGN PATENT DOCUMENTS

| | | |
|---|---|---|
| DE | 103 29 461 A1 | 2/2005 |
| DE | 10 2007 025 631 A1 | 12/2008 |
| DE | 60 2005 005 364 T2 | 4/2009 |
| DE | 10 2010 003 497 A1 | 10/2011 |
| DE | 10 2011 108 287 A1 | 8/2012 |
| EP | 1 617 098 B1 | 6/2011 |
| JP | H04 151381 A | 5/1992 |
| JP | 2005 271872 A | 10/2005 |
| JP | 2009 001238 A | 1/2009 |

OTHER PUBLICATIONS

English translation of International Search Report for International patent application No. PCT/EP2014/060407; dated Jul. 30, 2014.
English translation of the abstract of JP 2005 271872 A.
English translation of the abstract of DE 103 29 461 A1.
English translation of the abstract of JP H04 151381 A.
English translation of the abstract of JP 2009 001238 A.
English translation of the abstract of DE 10 2011 108 287 A1.
English translation of the abstract of DE 10 2007 025 631 A1.
English translation of the abstract of DE 44 07 731 A1.

* cited by examiner

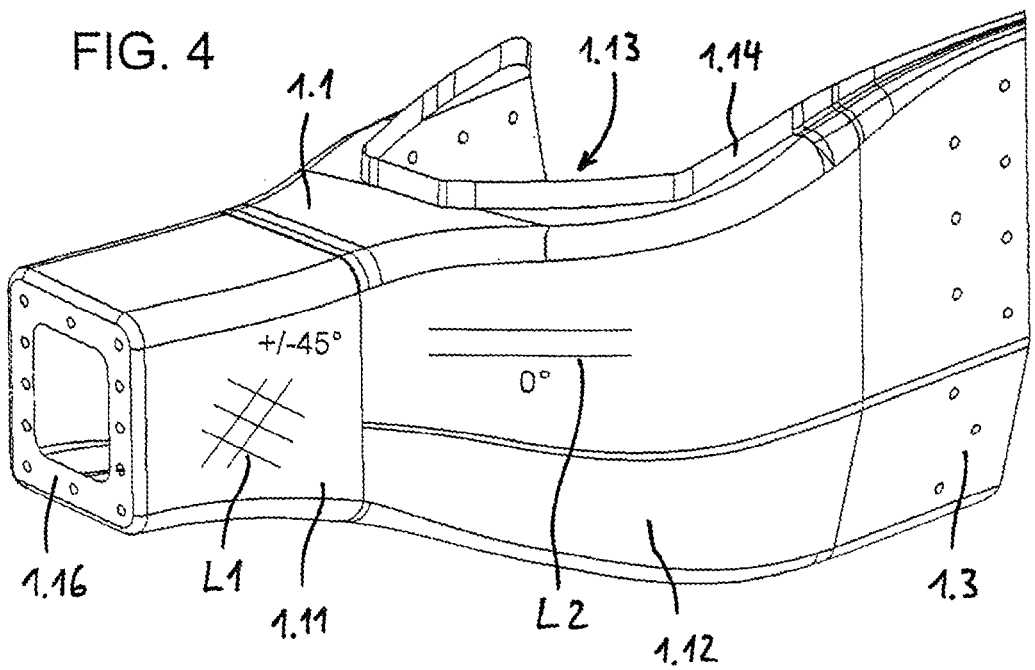
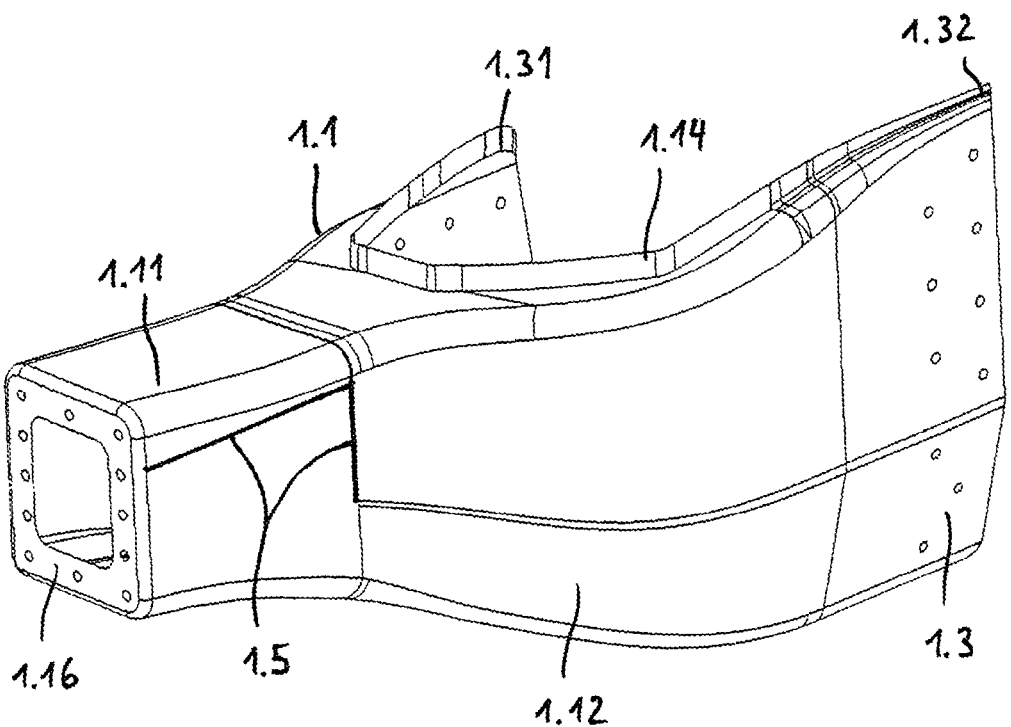

INTEGRAL LONGITUDINAL MEMBER FOR MOTOR VEHICLES

CROSS REFERENCE TO RELATED APPLICATIONS

This application is a U.S. National Stage Entry of International Patent Application Serial Number PCT/EP2014/060407, filed May 21, 2014, which claims priority to German Patent Application No. DE 102013106073.0 filed Jun. 12, 2013, the entire contents of both of which are incorporated herein by reference.

FIELD

The present disclosure relates to motor vehicles and, more particularly, longitudinal members for motor vehicles that are capable of absorbing impact energy.

BACKGROUND

Currently, vehicle front structures are predominantly designed to the effect that they are substantially composed of metallic components in view of the supporting function and the impact energy absorption. Disadvantages of said structures include, in particular, the relatively high weight and the complicated manufacturing, i.e. the blank, the deformation and joining, and also the limited variability of the wall thicknesses in respect of the requirements regarding rigidity and crash performance. Furthermore, repair following a collision proves highly complicated since, in the event of corresponding crash loads, the entire front section structure may possibly need to be replaced as a consequence of the energy absorption by deformation also reaching over the entire part.

JP 2005-271872 A describes a longitudinal member for a motor vehicle, which is constructed from a supporting element and a tubular energy absorption element, wherein the two elements are produced from fiber reinforced plastic. The supporting element has a length portion designed as a closed hollow profile and a length portion of substantially U-shaped design, and contains a supporting core made of foam. A hollow chamber is formed in the supporting core in the region of the closed hollow profile, said hollow chamber being connected to the hollow chamber defined by the tubular energy absorption element and serving, in the event of a high crash load, to receive a part of the energy absorption element that is slipped inward as a consequence of the deformation. In addition, metal parts are embedded in the supporting element in order to connect other body structure parts thereto. The supporting element and the energy absorption element are adhesively bonded to each other.

In the case of the longitudinal member known from JP 2005-271872 A, it is in particular unsatisfactory that the repair of said longitudinal member following a collision with a high crash load is scarcely possible or at any rate is highly complicated because of the integrally bonded adhesive connection of supporting element and energy absorption element.

The present disclosure relates to a longitudinal member for a motor vehicle, in particular an electric vehicle, with an energy absorption element for absorbing impact energy, and a supporting element for supporting chassis and/or drive components. The supporting element may have a joining zone for connection to at least one adjacent body part. Further, the energy absorption element and the supporting element may in some cases be produced from fiber reinforced plastic. Still further, the present disclosure is based on the object of providing a longitudinal member that absorbs both crash loads and operating loads, in particular chassis loads, has a low weight, contributes to an improved structural rigidity of the vehicle front or rear structure and is comparatively easy to repair.

This object is achieved according to the invention by a longitudinal member with the features of claim 1. Preferred and advantageous refinements of the longitudinal member according to the invention are specified in the dependent claims which refer back to claim 1.

The longitudinal member according to the invention is characterized in that the supporting element has length portions of differing fiber orientation, wherein one of the length portions contains reinforcing fibers running substantially parallel to a horizontal longitudinal plane of the longitudinal member, while a further length portion of the supporting element, which length portion is located between the energy absorption element and the first-mentioned length portion contains intersecting reinforcing fibers running obliquely with respect to the longitudinal axis of the longitudinal member, and in that the energy absorption element and the supporting element are connectable releasably to each other.

By means of the length portions of different fiber orientation, there is an increase firstly in the flexural rigidity and secondly in the torsional rigidity of the supporting element or longitudinal member, wherein the reinforcing fibers running substantially parallel to a horizontal longitudinal plane of the longitudinal member serve, in addition to improving the flexural rigidity, in particular also for absorbing crash loads (impact loads). At the same time, the supporting element of the longitudinal member according to the invention contributes considerably, by means of length portions thereof of different fiber orientation, to an improved structural rigidity of the vehicle front or rear structure. Furthermore, the longitudinal member according to the invention, as a lightweight component produced from fiber reinforced plastic, meets the requirement for a low component weight. In addition, because of the releasable connection between energy absorption element and supporting element, the longitudinal member according to the invention is easy to repair. This is because the energy absorption element can therefore be replaced by a new energy absorption element following a collision in which said energy absorption element was exposed to relatively low crash loads.

In an advantageous refinement of the longitudinal member according to the invention, the supporting element has a fastening flange or a fastening region for the releasable connection of the energy absorption element. The fastening flange or fastening region permits a reliable connection of supporting element and energy absorption element, wherein, at the same time, a substantially uniform transmission of force from the energy absorption element to the supporting element is ensured. Furthermore, the torsional rigidity of the supporting element or of the longitudinal member is improved by the fastening flange or fastening region.

A further advantageous refinement of the longitudinal member according to the invention is characterized in that the energy absorption element has a sleeve-like end with a shoulder, into which the supporting element is inserted or is insertable. This refinement facilitates the installation of the energy absorption element and contributes to a particularly reliable connection of supporting element and energy absorption element.

According to a further advantageous refinement of the longitudinal member according to the invention, the energy absorption element of said longitudinal member has an integrated foam structure. By this means, the crash load absorption capacity of the longitudinal member according to the invention can be further improved.

In a further advantageous refinement of the longitudinal member according to the invention, the energy absorption element has length portions of different wall thickness. The wall thickness of the energy absorption element preferably decreases here continuously or in a stepwise manner from the supporting element in the direction of that end of the energy absorption element which faces away from the supporting element. By this means, the crash performance of the longitudinal member according to the invention can be optimized.

Furthermore, the crash performance of the longitudinal member according to the invention can also be optimized if, according to a further preferred refinement, the energy absorption element has length portions of different cross-sectional shape, wherein said energy absorption element merges from a round cross-sectional profile into a substantially rectangular cross-sectional profile in the direction of the supporting element.

In order to obtain a low component weight, in a further preferred refinement of the longitudinal member according to the invention, the supporting element of said longitudinal member is designed as a continuous hollow body. The supporting element here is designed as a closed hollow profile at least over a length portion, wherein the profile cross section is preferably designed so as to be variable, i.e. different, over the longitudinal axis of the supporting element.

In order to be able to introduce operating loads, such as, for example, chassis loads, over a large area into the supporting element and in order to be able further to reduce in particular the wall thickness and therefore the weight of the longitudinal member or of the vehicle as a whole by means of the introduction of load over a large area, according to a further preferred refinement of the invention the supporting element is provided with a bracket for the connection of a chassis or drive component.

It is also advantageous for the lightweight construction of the longitudinal member according to the invention, if, according to a further preferred refinement, the supporting element has reinforcing ribs arranged on the inside.

A further advantageous refinement of the longitudinal member according to the invention is characterized in that the joining zone for the connection of the supporting element to at least one adjacent body part is of U-shaped design. By this means, in particular, the structural rigidity of a front section region and the absorption of crash loads, in particular the distribution of the latter to adjacent body parts, such as, for example, the end wall (splash wall) separating the passenger compartment from the engine compartment, can be optimized. In this connection, in a further preferred refinement of the invention, the U-shaped joining zone has a clear width which is at least two times, preferably at least 2.5 times the cross-sectional width of the supporting element at the transition thereof to the energy absorption element. In this case, the longitudinal member according to the invention can define a part of the end wall, in particular a part of the footwell wall, in the front section, wherein a further reduction in the vehicle weight can be achieved by means of this additional function.

According to a further advantageous refinement of the longitudinal member according to the invention, the supporting element and/or the energy absorption element have/has at least one rectilinear marker line. The latter can be used for calibrating (aligning) the longitudinal member or the elements thereof and therefore serves for quality assurance or functional optimization.

The invention is explained in more detail below with reference to a drawing which illustrates a plurality of exemplary embodiments and in which, schematically:

BRIEF DESCRIPTION OF THE FIGURES

FIG. 4 is a perspective view of an example supporting element of a longitudinal member.

FIG. 5 is another perspective view of an example supporting element of a longitudinal member.

DETAILED DESCRIPTION

Figure 1:
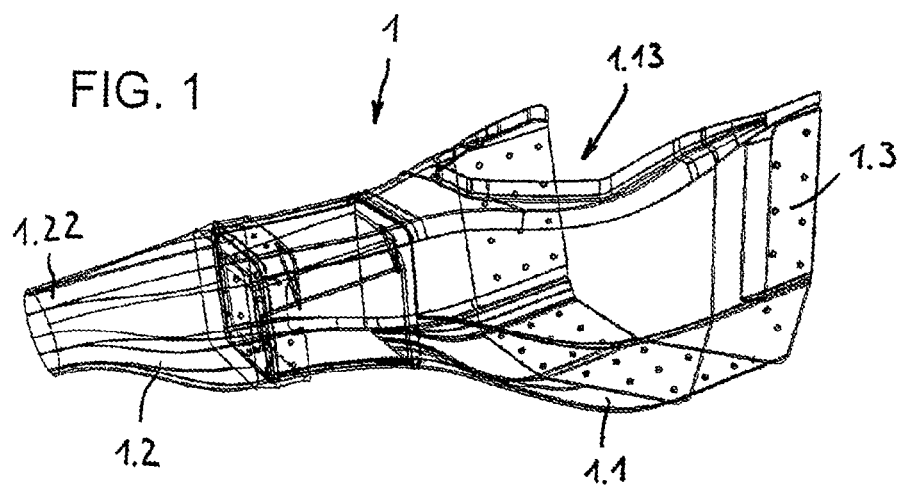
FIG. 1 is a perspective view of an example longitudinal member for use in a motor vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The longitudinal member 1 illustrated in the drawing is determined in particular for fitting into a vehicle front structure. Said longitudinal member is constructed from a supporting element 1.1 for supporting at least one chassis or drive component (not shown) and from an energy absorption element 1.2 for absorbing impact energy (crash loads), wherein the supporting element 1.1 has a joining zone 1.3 for the connection of the longitudinal member 1 to at least one adjacent body part, such as, for example, a vehicle floor plate, a splash wall and/or an A pillar.

The supporting element 1.1 and the energy absorption element 1.2 are both produced from fiber reinforced plastic. The fiber reinforced plastic contains a reinforcing textile which is preferably formed from a woven fabric and/or braid made of glass or carbon fibers and is embedded into a matrix material made from thermoplastic or thermosetting plastic. One or more layers of the reinforcing textile can be embedded in the wall of the supporting element 1.1 or energy absorption element 1.2. The wall thickness of the supporting element 1.1 or energy absorption element 1.2 lies, for example, within the range of approx. 2 to 6 mm.

The energy absorption element 1.2 is connected releasably to the supporting element 1.1. The supporting element 1.1 is designed as a continuous hollow body. Said supporting element has length portions of different cross-sectional shape. The length portion 1.11 connected to the energy absorption element 1.2 has a closed, substantially rectangular cross-sectional shape (profile shape) and merges into a width- and height-extended length portion 1.12 which has a recess (niche-shaped opening) 1.13 on the upper side thereof and is therefore of U-shaped design in particular in the region of the joining zone 1.3. An upwardly protruding collar 1.14 is integrally formed on the recess 1.13. The collar 1.14 is preferably formed continuously and extends from the one limb end 1.31 of the U-shaped joining zone 1.3 as far as the other limb end 1.32 thereof. Furthermore, a connection or reinforcing rib 1.15 can be integrally formed on the outside of the supporting element 1.1, in particular adjacent to the joining zone 1.13.

The supporting element 1.1 has a fastening region 1.18 on the end side thereof facing the energy absorption element 1.2. A sleeve-like end 1.21, into which the supporting element 1.1 is inserted or is insertable, is formed on the energy absorption element 1.2. The sleeve-like end 1.21 here has, on the inside, a shoulder (stop) which limits the insertion depths of the supporting element 1.1. The preferably releasable connection is undertaken in the overlapping region of the sleeve-like end 1.21 and of the fastening region 1.18.

Figure 2:
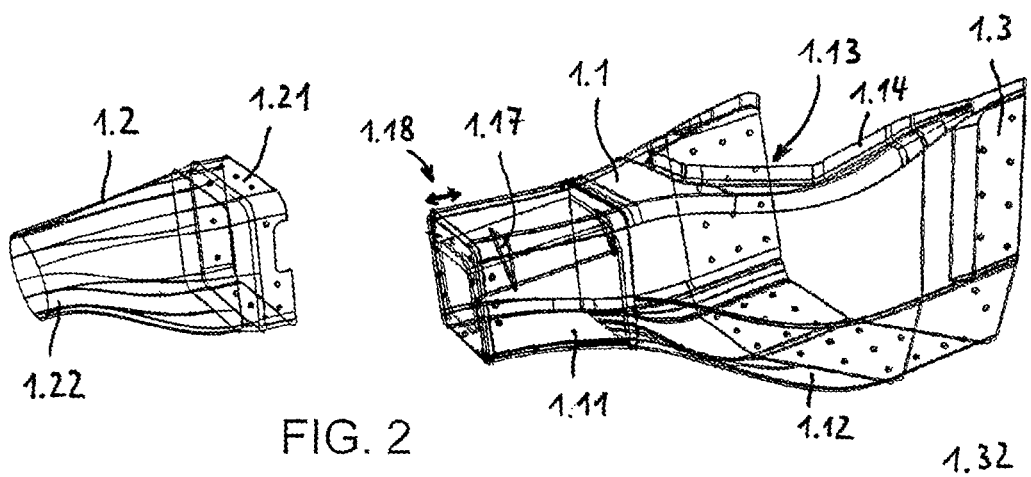
FIG. 2 is a perspective view of the example longitudinal member of FIG. 1 wherein an example energy absorption element is shown to be detached from an example supporting element.
Figure 3:
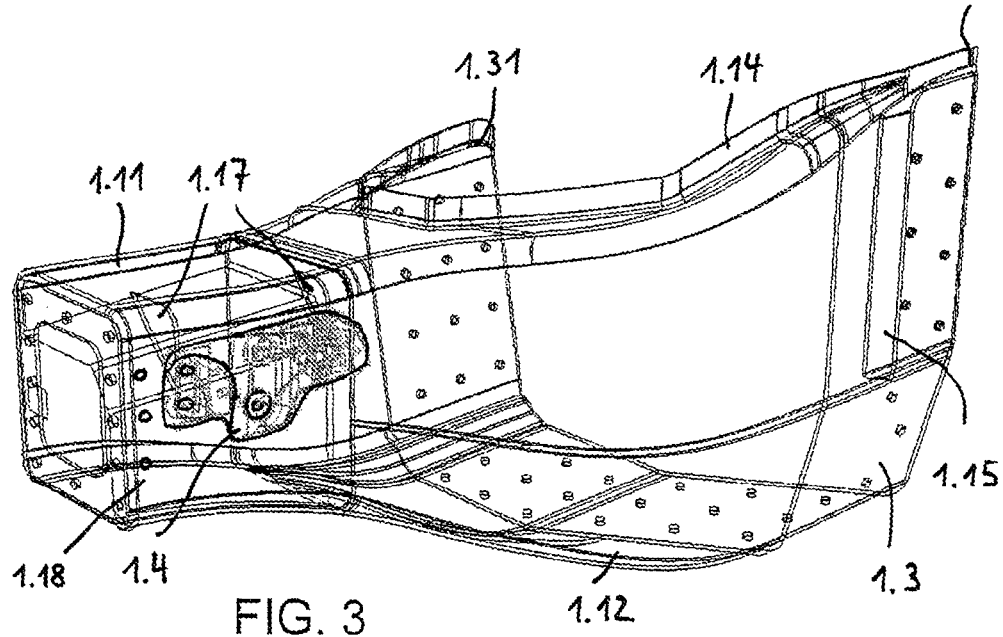
FIG. 3 is a perspective view of the example supporting element of the example longitudinal member of FIG. 2 with an example bracket attached thereto for connection to a chassis or drive component.

Alternatively, in the case of another refinement of the energy absorption element (not illustrated here in FIGS. 1 to 3), the connection to the supporting element 1 can also be undertaken via a fastening flange 1.16 which is directed radially inward (cf. FIGS. 4 and 5).

The joining zones 1.18 and/or 1.3 or 1.16 and/or 1.3 of the longitudinal member 1 according to the invention are designed in such a manner that said longitudinal member can be joined both releasably and also nonreleasably. In order to permit or to facilitate a replacement of the energy absorption element 1.2 in the event of repair, the energy absorption element 1.2 and the supporting element 1.1 are preferably connected releasably to each other.

Furthermore, one or more brackets 1.4, angle brackets or the like can be attached, preferably laterally, to the supporting element 1.1, in particular can be integrally formed thereon or fitted releasably thereto, and to which chassis components (not shown), for example a transverse link, can be fitted.

The energy absorption element 1.2 is of substantially tubular design. It preferably has a closed cross-sectional shape. The cross-sectional shape changes, however, over the length of the energy absorption element 1.2. The connecting portion with the sleeve-like end 1.21 has a substantially rectangular cross-sectional profile in a manner corresponding to the adjoining length portion 1.11 of the supporting element 1.1. The energy absorption element 1.2 merges in the direction of the end thereof facing away from the supporting element 1.1 into a round cross-sectional profile 1.22. The outside diameter of the round cross-sectional profile 1.22 is significantly smaller at the end to be connected to a bumper (not shown) or the like than the width or height of the rectangular cross-sectional profile at the opposite end 1.21 which is connected or is connectable to the supporting element.

According to the invention, the supporting element 1.1 has length portions 1.11, 1.12 of different fiber orientation, wherein one (1.12) of the length portions contains reinforcing fibers running substantially parallel to a horizontal longitudinal plane of the longitudinal member 1 or parallel to the longitudinal axis of the vehicle, while a further length portion (1.11) of the supporting element 1.1, which length portion is located between the energy absorption element 1.2 and the first-mentioned length portion 1.12, contains intersecting reinforcing fibers running obliquely with respect to the longitudinal axis of the longitudinal member 1. This is indicated schematically in FIG. 4 by intersecting lines L1 and by lines L2 running parallel to one another. The intersecting lines L1 correspond to reinforcing fibers made of glass fibers or preferably carbon fibers, which run obliquely with respect to the longitudinal axis of the longitudinal member 1, for example, substantially at an angle of approx. +/−45°. Such a fiber orientation can be produced, for example, by braiding reinforcing threads produced from reinforcing fibers. The reinforcing fibers running substantially parallel to a horizontal longitudinal plane of the longitudinal member 1 or parallel to the longitudinal axis of the vehicle can be produced, for example, by corresponding laying of reinforcing threads (L2) produced from reinforcing fibers.

The intersecting reinforcing fibers (L1) running obliquely with respect to the longitudinal axis of the longitudinal member 1, for example at an angle of approx. +/−45° increase the torsional rigidity of the longitudinal member 1. The reinforcing fibers (fiber layers L2), which run substantially parallel to a horizontal longitudinal plane of the longitudinal member 1 or parallel to the longitudinal axis of the vehicle, serve to absorb crash loads and increase the flexural rigidity of the longitudinal member 1.

In order to further increase the rigidity of the longitudinal member 1, in particular the torsional rigidity thereof, the supporting element 1.1 can also be provided with reinforcing ribs 1.17. The reinforcing ribs 1.17 are preferably formed on the inside of the supporting element 1.1, specifically in the length portion 1.11 having the closed rectangular cross-sectional profile (cf. FIGS. 2 and 3).

In the exemplary embodiment illustrated in FIG. 5, the supporting element 1.1 has, on the outside, two rectilinear marker lines 1.5 which together enclose an angle, preferably an angle of 90°. Said markers 1.5 can be used for calibrating (aligning) the longitudinal member 1 or the elements 1.1, 1.2 thereof. They therefore serve for quality assurance or functional optimization.

Figure 6:
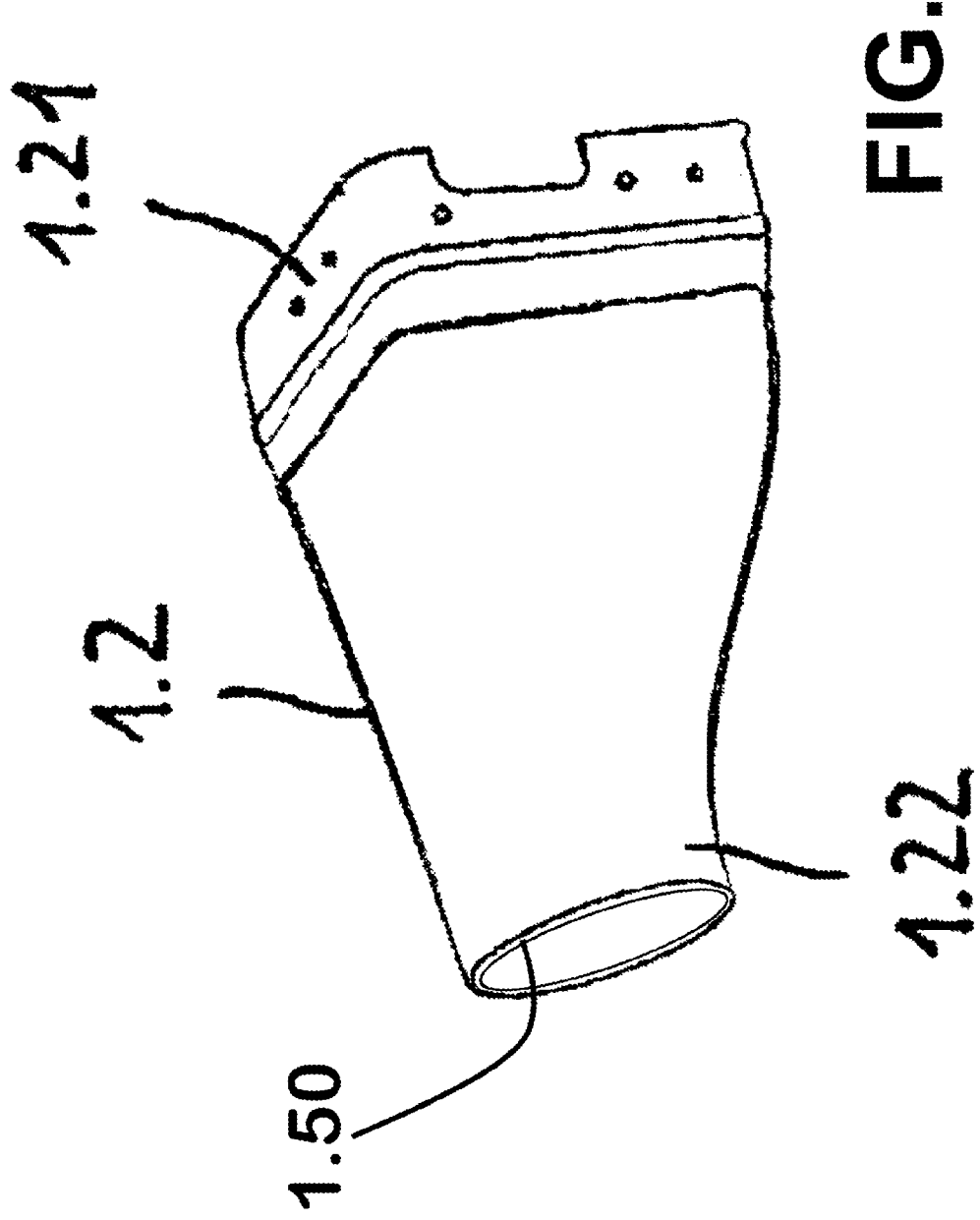
FIG. 6 is a perspective view of an example energy absorption element with an example integrated foam structure.

The design of the longitudinal member 1 according to the invention is not restricted to the exemplary embodiments illustrated in the drawing. On the contrary, numerous variants which are also used in a configuration, differing from the drawing, of the invention specified in the appended claims, are conceivable. For example, the energy absorption element 1.2 can contain an integrated foam structure 1.50 as shown in FIG. 6 and/or can have length portions of different wall thickness. Furthermore, a longitudinal member 1 according to the invention can also serve for the separation of a wet region and dry region of the vehicle concerned. In particular, the longitudinal member 1 according to the invention can bound a footwell in the vehicle front structure.

What is claimed is:

1. A longitudinal member for a motor vehicle wherein the longitudinal member is oriented along a longitudinal axis in a horizontal longitudinal plane, the longitudinal member comprising:
    a supporting element for supporting chassis and/or drive components, wherein the supporting element includes a joining zone connectable to at least one adjacent body part of the motor vehicle, wherein the supporting element is oriented along the longitudinal axis in the horizontal longitudinal plane; and
    an energy absorption mechanism releasably connectable to the supporting element and configured to absorb impact energy,
    wherein the energy absorption mechanism and the supporting element are comprised of fiber-reinforced plastic, wherein the supporting element has a plurality of length portions with differing fiber orientations, wherein a first length portion of the plurality of length portions includes reinforcing fibers that are substantially parallel to the horizontal longitudinal plane, wherein a second length portion of the plurality of length portions is located between the energy absorption mechanism and the first length portion and includes intersecting reinforcing fibers that are oblique to the longitudinal axis.

2. The longitudinal member of claim 1 wherein the supporting element comprises a fastening flange or a fastening region for releasably connecting the supporting element to the energy absorption mechanism.

3. The longitudinal member of claim 1 wherein the energy absorption mechanism comprises a sleeve-like end with a shoulder into which the supporting element is insertable.

4. The longitudinal member of claim 1 wherein the energy absorption mechanism comprises an integrated foam structure.

5. The longitudinal member of claim 1 wherein the energy absorption mechanism comprises a plurality of length portions with differing wall thicknesses.

6. The longitudinal member of claim 1 wherein the energy absorption mechanism comprises a plurality of length portions having different cross-sectional shapes, wherein the energy absorption mechanism transitions from a round cross-sectional profile at a first length portion to a substantially rectangular cross-sectional profile at a second length portion, with the second length portion being more proximate to the supporting member than the first length portion.

7. The longitudinal member of claim 1 wherein the supporting element comprises a continuously hollow body.

8. The longitudinal member of claim 1 wherein the supporting element comprises a bracket for connection to the chassis and/or drive components.

9. The longitudinal member of claim 1 wherein the supporting element comprises an inside and an outside, wherein the inside of the supporting element comprises reinforcing ribs.

10. The longitudinal member of claim 1 wherein the joining zone comprises a U-shaped design.

11. The longitudinal member of claim 1 wherein the U-shaped design of the joining zone is at least two and a half times as wide as a width of the supporting element at a point where the supporting element connects to the energy absorption mechanism.

12. The longitudinal member of claim 1 wherein at least one of the supporting element or the energy absorption mechanism includes a rectilinear marker line.

13. A longitudinal member for absorbing impact energy in a motor vehicle, wherein the longitudinal member is oriented in a horizontal longitudinal plane, the longitudinal member comprising:

a supporting element for supporting at least one of a chassis component or a drive component, wherein the supporting element is connectable to at least one adjacent body part of the motor vehicle, with the supporting element being oriented in the horizontal longitudinal plane; and an energy absorption mechanism releasably securable to the supporting element, wherein the energy absorption mechanism and the supporting element are comprised of fiber-reinforced plastic, wherein the supporting element has a first length portion with reinforcing fibers that are substantially parallel to the horizontal longitudinal plane, wherein the supporting element has a second length portion located between the energy absorption mechanism and the first length portion, with the second length portion including intersecting reinforcing fibers that are oblique to the horizontal longitudinal plane.

* * * * *